(12) United States Patent
Sumner

(10) Patent No.: US 7,346,793 B2
(45) Date of Patent: Mar. 18, 2008

(54) SYNCHRONIZATION OF MULTIPLE OPERATIONAL FLIGHT PROGRAMS

(75) Inventor: Roger Theodore Sumner, Solana Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 406 days.

(21) Appl. No.: 11/055,753

(22) Filed: Feb. 10, 2005

(65) Prior Publication Data

US 2006/0179338 A1 Aug. 10, 2006

(51) Int. Cl.
*G06F 1/04* (2006.01)
*G06F 15/16* (2006.01)
*G06F 1/12* (2006.01)
*H04L 7/00* (2006.01)

(52) U.S. Cl. ..................... 713/375; 713/400
(58) Field of Classification Search ............. 700/375; 713/375, 400
See application file for complete search history.

(56) References Cited

U.S. PATENT DOCUMENTS

| | | | |
|---|---|---|---|
| 3,810,119 A | 5/1974 | Zieve et al. | |
| 3,863,156 A * | 1/1975 | Bogert | 375/327 |
| 4,546,326 A * | 10/1985 | Van Uffelen et al. | 330/129 |
| 4,733,353 A | 3/1988 | Jaswa | |
| 4,937,741 A * | 6/1990 | Harper et al. | 713/375 |
| 4,976,069 A * | 12/1990 | Arima et al. | 49/490.1 |
| 5,233,615 A | 8/1993 | Goetz | |
| 5,353,436 A | 10/1994 | Horst | |
| 5,361,277 A | 11/1994 | Grover | |
| 5,428,645 A | 6/1995 | Dolev et al. | |
| 5,455,935 A | 10/1995 | Taylor et al. | |
| 5,613,127 A | 3/1997 | Schultz | |
| 5,654,815 A | 8/1997 | Bunse | |
| 5,682,480 A * | 10/1997 | Nakagawa | 712/28 |
| 5,751,932 A | 5/1998 | Horst et al. | |
| 5,784,377 A | 7/1998 | Baydar et al. | |
| 5,786,732 A * | 7/1998 | Nielson | 331/1 A |
| 5,845,060 A | 12/1998 | Vrba et al. | |
| 5,910,753 A * | 6/1999 | Bogdan | 331/17 |
| 6,034,901 A | 3/2000 | Toda | |
| 6,297,702 B1 | 10/2001 | Locker et al. | |
| 6,308,223 B1 | 10/2001 | Opgenoorth | |
| 6,353,604 B2 | 3/2002 | Grimwood et al. | |
| 6,415,006 B2 | 7/2002 | Rude | |
| 6,538,516 B2 | 3/2003 | Lenk | |
| 6,560,303 B1 * | 5/2003 | Fan et al. | 375/365 |
| 6,735,711 B2 | 5/2004 | Lutz | |
| 6,801,544 B1 * | 10/2004 | Rijckaert et al. | 370/473 |

* cited by examiner

*Primary Examiner*—Chun Cao
*Assistant Examiner*—Michael Wang
(74) *Attorney, Agent, or Firm*—Robert P. Lenart, Esq.; Pietragallo Gordon Alfano Bosick & Raspanti, LLP

(57) ABSTRACT

A method for synchronizing frame clocks in a plurality of processors comprises the steps of sending data packets from each of the processors to each of the other processors wherein each of the processors receives the data packets and identifies two of the data packets having the largest phase difference. The largest phase difference is used to determine a target synchronization phase angle, and the period of a frame clock is adjusted so that the frame clock approaches the target synchronization phase angle.

9 Claims, 2 Drawing Sheets

SYNCHRONIZATION OF MULTIPLE OPERATIONAL FLIGHT PROGRAMS

FIELD OF THE INVENTION

This invention relates to the synchronization of redundant digital control systems, and more particularly, to the synchronization of data flow between components of digital flight control systems in unmanned air vehicles (UAVs).

BACKGROUND OF THE INVENTION

Redundant flight control systems that include two or more vehicle management computers (VMCs) are used on UAVs to increase the reliability of the UAVs. Such redundant control systems are operated in parallel and can share data relating to the control of the UAVs. The control systems must be synchronized to achieve a smooth transfer of control from one VMC to the other, to simplify the control processing logic and to ensure that each VMC can share state information without large time skews. One unmanned aerial vehicle (UAV) uses a dual-redundant flight control computer (VMC) architecture running in a frame-synchronize manner to achieve the goal of less than one catastrophic lost of an air vehicle in two hundred flights.

To achieve a lower probability of catastrophic loss, a multi-redundant UAV VMC architecture could be used. Thus there is a need to provide synchronization of the frame clocks of a multi-redundant UAV VMC architecture.

SUMMARY OF THE INVENTION

A method for synchronizing frame clocks in a plurality of processors comprises the steps of sending data packets from each of the processors to each of the other processors wherein each of the processors receives the data packets and identifies two of the data packets having the largest phase difference. The largest phase difference is used to determine a target synchronization phase angle, and the period of a frame clock is adjusted so that the frame clock approaches the target synchronization phase angle.

DETAILED DESCRIPTION OF THE INVENTION

Figure 1:
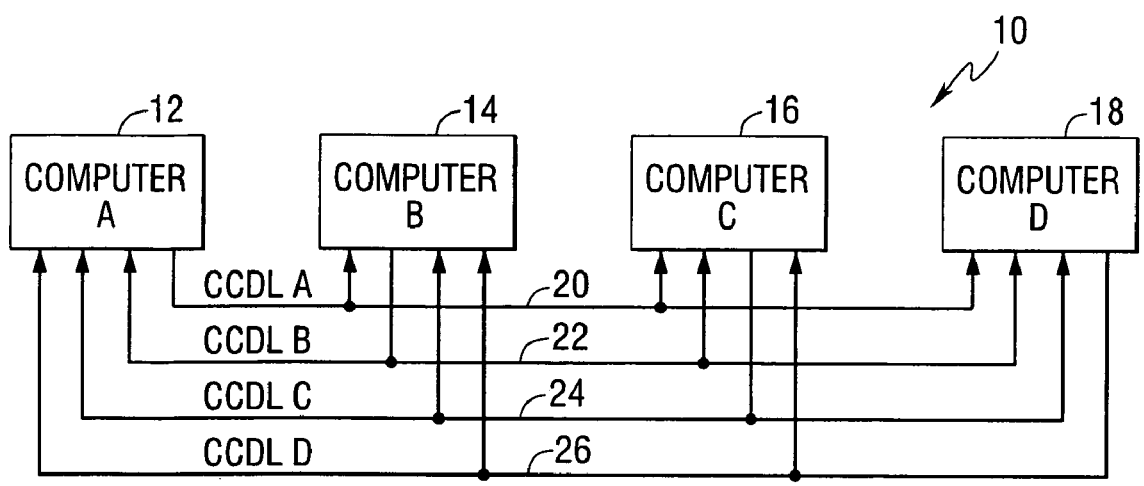
FIG. 1 is a block diagram of a flight control system that can utilize the method of this invention.

Referring to the drawings, FIG. 1 is a block diagram of a flight control system for an unmanned aircraft. The flight control system 10 includes a plurality of Vehicle Management Computers (VMCs) (also referred to as microprocessors or processors) 12, 14, 16 and 18, that run software used for flight control, such as operational flight programs (OFPs). The VMCs interface with various sensors and actuators to control the aircraft. The VMCs operate using timing signals from separate programmable clocks, which are used to produce frame clock signals. Time periods defined by the frame clock signals are referred to as frame clock periods. The frame clock periods are used to control the timing of the operation of the VMCs. The computers can operate independently, but must operate synchronously so that control functions can be easily transferred from one computer to another and so state information can be shared without significant time skews. Cross Channel Data Links (CCDLs) 22, 24, 26 and 28 are used to transfer data and control information between the VMCs.

This invention provides the decision logic that determines the time base to which all VMCs will be synchronized. In one embodiment, the synchronization method uses a phase-lock loop implemented in software, to allow all participating VMCs to operate their frame clocks within a micro-second or so of each other, depending upon interrupt service latency (i.e. the time between when the VMC receives an interrupt signal and the time that the processor begins execution of the interrupt processing algorithm) and the damping ratio used in the algorithm.

In flight control systems that implement the invention, each VMC is connected to N−1 other VMCs (where N is the total number of VMCs) connected via bi-directional Cross Channel Data Links CCDL(s). Each VMC includes a frame clock having a programmable period. The frame clock periods of the VMCs are initially set to be the same. However, the source clock oscillator of each VMC is free running, and thus the source clock oscillators are out-of-phase with respect to each other causing the actual frame clock periods of each VMC to be different. In addition, the number of participating VMCs may change over time, including during startup and during normal operation resulting from a failure of one or more VMCs.

The VMCs send health, status, sensor and state information data to each other on the CCDLs once every frame. The actual arrival time of CCDL data at each VMC from each of the other VMCs can be measured. The expected arrival time of a VMC's CCDL transmissions sent to the other VMCs is known, and that time is equal to the frame clock of the sending VMC. The arrival time of CCDL data from a given VMC is essentially the same in all receiving VMCs.

Each VMC initiates the transmission of CCDL data to all other VMCs ahead of its frame clock by a predetermined packet transmission time. The VMCs measure the arrival time(s) of CCDL data packets from the other VMC(s) relative to the current local frame clock. If no CCDL data is received, then no action is taken because the system is operating in the single VMC mode.

Each VMC compares its current local frame time and the arrival times of CCDL data from the other VMCs, and a timestamp is assigned to the CCDL data packet received from the other VMCs. Then the two timestamps that have the largest phase difference are identified. One of the timestamps may be the current time, since the current time corresponds to the arrival time of that VMC's CCDL data at the other VMCs.

An angle representing the phase difference of the two timestamps having the largest phase difference is bisected and a phase angle of 180° is added to determine a target synchronization phase angle. Then the phase difference between the current time and the target phase angle is determined. The period of the next frame clock is increased or decreased by an adjustment period equal to the phase difference multiplied by a damping ratio. Then the process is repeated.

In one embodiment of the invention, the frame synchronization method is used in a multi-redundant flight control computer system. The method is based on a servo-loop implemented in software that adjusts an internal interrupt clock in each flight control computer so that the expected time of receipt matches the actual time of receipt of a 400 Hertz cross-channel data link data packet. The times can be measured from any part of the data packets, as long as each VMC uses the same part to perform the measurement.

The internal timer interrupt clock for each processor can be initially set to interrupt the processor at a nominal 400 Hertz. Upon receipt of the 400 Hertz internal timer clock interrupt, each processor sends a packet of 80 bytes across the cross-channel data link, and measures the time at which the data packet from the other VMC was received. Due to manufacturing tolerances, the crystals clocking the microprocessors in each VMC are not running at exactly the same frequency. This results in a time difference between when a packet is received and when it is expected to be received. This time difference is then used to adjust the value loaded in each VMC's internal timer interrupt clock.

Figure 2:
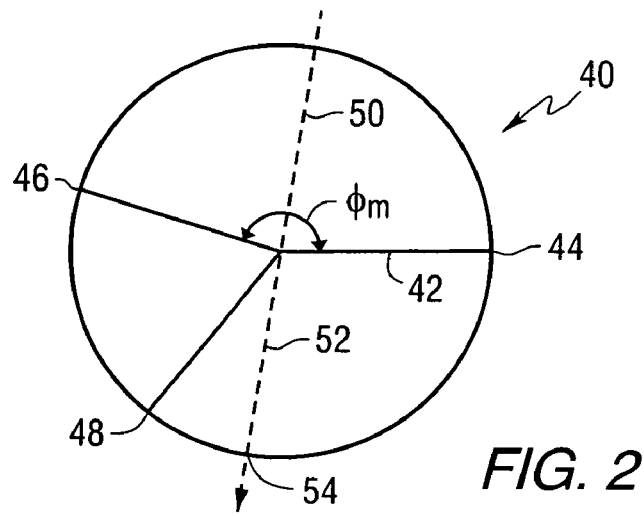
FIGS. 2 and 3 are diagrams that illustrate that operation of this invention.

The pie chart of FIG. 2 illustrates the operation of the invention for three VMCs. The whole circle 40 represents one cycle of the nominal frame clock period. The X Axis 42 represents a particular VMC's current time (zero phase error). The other points on the circle represent the frame relative arrival times of CCDL data from the other VMCs, giving a phase angle relationship. For example, if point 44 on the X Axis represents VMC A, then point 46 can represent the arrival time of CCDL data from VMC B and point 48 can represent the arrival time of CCDL data from VMC C. The angle $\phi_m$ represents the greatest phase difference between the data arrival times. Angle $\phi_m$ can be bisected as illustrated by line 50. A 180° phase shift is added to the bisected angle to determine a target convergence angle represented by line 52 and point 54 on the circle.

Each VMC has essentially the same picture, just rotated where each VMC's phase error based on the current time is 0° (along the X axis). The algorithm described above results in all N VMCs finding the same largest piece of the pie, then adjusting their periods to make that piece bigger each cycle. In this case VMC A will rotate its cycle time clockwise (i.e.—increase its frame period), VMC B will rotate its cycle counterclockwise (i.e.—decrease its frame period), and VMC C will rotate its cycle counterclockwise (i.e.—decrease its frame period) more slowly than VMC B. Eventually the smaller pieces (between VMC B and VMC C, and between VMC A and VMC C) will diminish to practically nothing except for jitter. Jitter is a term used to describe the small increase or decrease in time of the adjusted frame time period that can't be eliminated due to limitations in the smallest size of the frame time period that can be used to make the adjustment, and due to limitations in how fast the synchronization algorithm is run. Normally the jitter is an order of magnitude smaller than the uncertainty in time that would cause the computers to not run in a synchronous manner (i.e.—execute their flight control algorithm software at the same rate). The two VMCs on the phase error extremes symmetrically converge towards the target synchronization phase angle. All other VMCs also converge but at a slower rate because their phase error is necessarily smaller.

Figure 3:
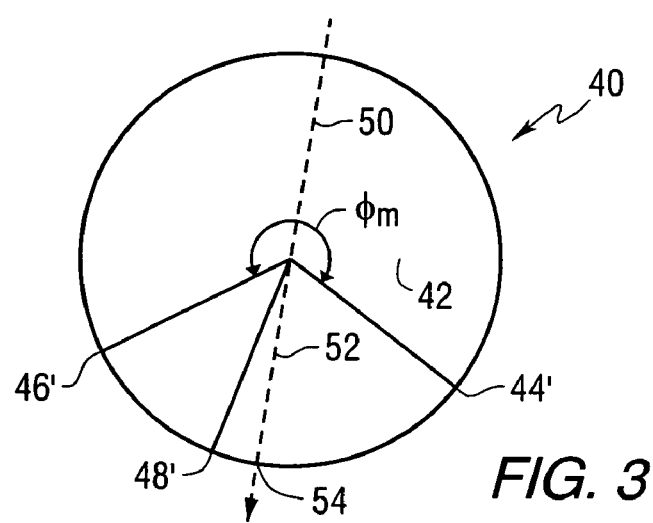

After a few cycles the pie appears as shown in FIG. 3. All VMCs are converging toward the target phase angle (represented by line 54) that does not change because the largest phase error $\phi_m$ only gets larger. In FIG. 3, point 44' represents the arrival time of a data packet from processor VMC A, point 46' represents the arrival time of a data packet from processor VMC B, and point 48' represents the arrival time of a data packet from processor VMC C. For the case illustrated in FIG. 3, VMC C is very near convergence to the target phase angle. Eventually both VMC A and VMC B will also converge.

Figure 4:
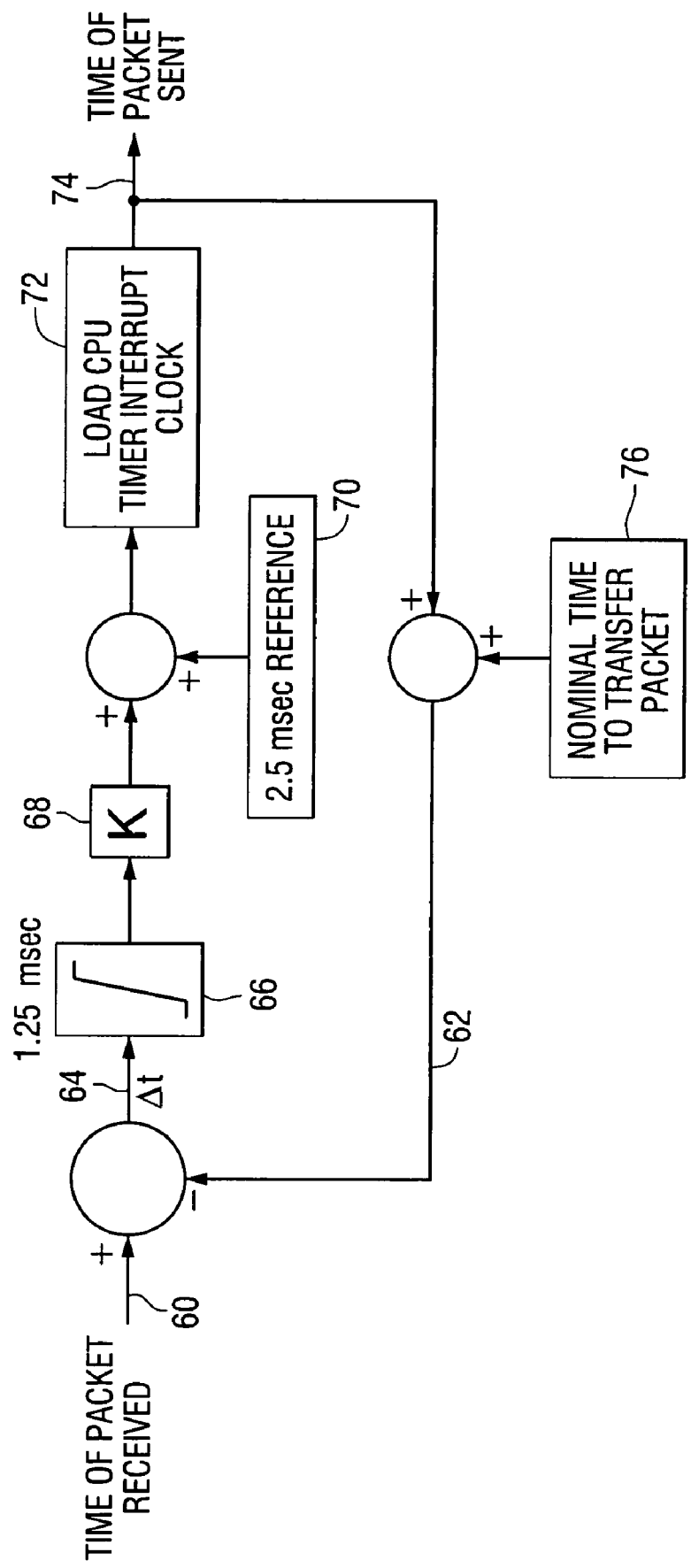
FIG. 4 is a schematic representation of the digital phase lock loop algorithm implemented in the VMC software that can be used when performing the method of this invention.

FIG. 4 is a schematic diagram that can be used to describe the method of adjusting the timing of the processors. The method starts by calculating the difference in time between when a packet is received, and when it is expected to be received. The expected time of receipt is equal to the time that the packet was sent plus the packet transfer time. The time that a packet is received is input as shown on line 60 and compared with an expected time of receipt on line 62 to produce a difference time on line 64. This difference is put through a digital limiter 66 as a protection against unreasonable difference values adversely affecting the 400 Hertz interrupt timer clock. The output of the digital limiter is then multiplied by a gain, or damping factor, of $\frac{1}{32}$ as illustrated by block 68, and 2.5 milliseconds is added to it ($\frac{1}{400}$ Hertz is equal to 2.5 milliseconds) as illustrated by block 70. Block 72 shows that the interrupt timer is then reloaded with this new value. The time that the packet was sent is output as illustrated by line 74. The expected time of receipt is then generated by adding nominal packet transfer time to the time that the packet was sent as shown by block 76. On the next 400 Hertz interrupt, the time at which the packet is expected to be received will then be closer in time to when the packet from another VMC is actually received. This adjustment is continually made until the time difference between when a packet is expected to be received and the time when a packet is received is zero or close to zero.

The damping ratio affects both the rate of initial synchronization and the amount of "jitter" during synchronized operation. A high damping ratio results in slower initial synchronization with little overshoot and low jitter. Conversely, a low damping ratio results in faster initial synchronization with higher overshoot and higher jitter. A damping factor of $\frac{1}{32}$ is suitable in the multi-redundant configuration.

The method of this invention can be implemented by assigning a timestamp to received data packets. A Timestamp Selection Algorithm can be used to initially check for data from each CCDL. If data has been received, it is copied into a local buffer. If the received data is from another VMC, the VMC is prepared to receive additional data and to indicate that at least one data packet has been received.

Consider for example, a plurality of VMCs identified as VMC A, VMC B, VMC C, etc. After VMC A receives the timestamp value of the CCDL message from VMC B, all timestamps for CCDL data from the other VMCs are normalized relative to the VMC A message timestamp.

If the synchronization algorithm state machine that controls the mode under which the algorithm operates is in "sync mode" and the time difference between VMC B and VMC C is more then $\frac{3}{4}$ of the total period, then put the state machine back into "not in sync mode". If the system is in a single VMC mode, then the algorithm is exited.

If multiple VMCs are active, then all non-zero time stamps are converted into a phase angle in 32-bit integer value (i.e. an LBAM or large binary angle measurement, where LBAM is the term used to describe the number residing in computer memory that represents the division of 360° into $2^{32}$ equal parts in a 32 bit integer) by taking the difference between the expected data packet time and the actual data packet time divided by 360°. Only the maximum absolute phase difference or phase delta is of interest. Note that this computation uses the nominal crystal rate because the VMCs have no measure of real time, only their local crystal reference.

Thus, the phase angle is calculated for each channel. A straight insertion sort is used to put the phase angles into smallest to largest order. Then the largest delta phase angle is found and bisected, and the opposite angle is computed by adding 180°. The (signed) result is the phase error between the frame clock for this VMC and the target phase angle.

The new frame clock period is determined by using the phase error suitably damped. A negative phase error indicates that the VMC is ahead and needs to extend its period. A positive phase error indicates that the VMC is behind and needs to shorten its period. If damped delta time is less then 25% of the total frame period, then this VMC is in sync, and this VMC shall perform the remainder of sync logic state machine to determine how the VMC should boot.

The sync states of other VMCs are then checked to see if one or more of the other VMCs is already up and running. If at least one other VMC indicates that it is in the SYNC_FULL mode, then this was a warm state boot-up and this VMC should enter back into SYNC_FULL mode. But if one or more but not all VMCs are in SYNC_FULL mode, then indicate that this VMC is in SYNC_PART mode. SYNC_FULL is the mode of the state machine that indicates all VMCs are running synchronously, and SYNC_PART is the mode of the state machine that indicates that one or more VMCs are running synchronously.

If this VMC is in SYNC_PART mode, then set the frame count equal to other frame counts and set sync mode to SYNC_FULL if other VMCs are in SYNC_PART or SYNC_FULL mode.

If this VMC is in the SYNC_FULL mode and has not received a packet from any CCDL, then there has been a framing error.

Next the VMC builds up a local CCDL packet and transmits it to the other VMCs. Initially the VMC can send one packet at a time without requesting buffer space in advance. This should not create a problem, and the real VMC CCDL can rely on the buffer being statically allocated.

Forward extrapolation is used to determine when the other VMCs will receive the CCDL data sent from this VMC relative to the local VMC clock, and this extrapolated time is called an "m_stamp". When the VMC is synced up, the "m_stamp" will be close to the received timestamps from the other VMCs. Note that this process is done even when the VMC doesn't transmit to simplify the sync logic described above.

Several requirements are fulfilled by this invention. It is essential that all participating VMCs reach the same decision as to what the transmission frame clock adjustment should be. It is highly desirable that all VMCs execute the same algorithm without special "modes". In addition, each VMC must not rely on any peculiar asymmetry in the VMC configuration (e.g. VMC A does something different than VMC B simply because it knows it's VMC A).

This invention provides a method for synchronizing the frame clocks of two or more VMCs. The method includes an algorithm that is continuously applied by all participating VMCs and provides for both initial VMC synchronization and continuing synchronization following initialization. The frame clock phase-lock concept can be generalized to accommodate any number of VMCs. The method incorporates an algorithm that is inherently stable for any number of OFPs. It is also inherently stable in the presence of OFP failures requiring either a warm or cold restart.

The decision logic guarantees that all participating VMCs converge to the same time base for synchronization independent of any asymmetry in the VMC configurations. In other words, all VMCs execute the same algorithm without special "modes" and do not rely on any peculiar asymmetry.

A "special mode" is an algorithm that operates differently depending on which VMC it is, and essentially means that each VMC must have a unique load of software instead of identical loads of software. An "asymmetry" is some hardware input to the VMCs that might tell them that they are VMC A or VMC B or VMC C, etc.

This invention provides a method for synchronizing multiple operational flight programs (OFPs) to maintain frame synchronous operation and positive control of a UAV. Additionally, the algorithm guarantees convergence to a common time base for cold, warm and hot restarts. Convergence is guaranteed by virtue of the fact that all VMCs measure the delta time differences between when a data packet is expected and when it is actually received, and that each VMC performs a sort of these differences to insure use of the "maximum" difference by each VMC in the synchronization algorithm.

In one embodiment, the use of the phase-lock concept allows all participating VMCs to operate their frame clocks within a microsecond or so, depending upon interrupt service latency and the damping ratio used in the algorithm. The damping ratio affects both the rate of initial synchronization and the amount of "jitter" during synchronized operation. A high damping ratio results in slower initial synchronization with little overshoot and low jitter. Conversely, a low damping ratio results in faster initial synchronization with higher overshoot and higher jitter. A damping ratio of $1/32$ is used in one example.

The method of this invention can be implemented by performing the following steps for each frame in each VMC:

1) Note the arrival time(s) of CCDL data packets from the other VMC(s) relative to the local current frame clock. The data packets are packets of information that each VMC exchanges with the other VMCs that defines the state, health, status and sensor information of the sending VMC. Software running on each processor utilizes a periodic interrupt signal to tell the processor in each VMC to sent its data packet. If a packet hasn't been received from one or more of the other VMCs, then the receiving VMC can determine if it is running in a single-string mode, in a partially synchronized mode, or in a fully synchronized mode.

2) Initiate transmission of CCDL data to all other VMCs ahead of the local frame clock by the packet transmission time.

3) If no CCDL data have been received, then no action is taken. This represents the single VMC mode.

4) Compare the current time and the arrival times of CCDL data from the other VMC(s). Identify the two timestamps that have the largest phase difference. One of the time stamps may be the current time. The current time corresponds to the arrival time of that VMC's CCDL data in the other VMCs.

5) Bisect the phase difference of the two timestamps and add 180° giving the target synchronization phase angle.

6) Determine the phase difference between the current time and the target phase angle.

7) Increase (or decrease) the period of the next frame clock by that difference multiplied times the damping ratio.

8) Repeat.

The effect of the algorithm is to have each VMC adjust its frame clock period to be either shorter or longer than the nominal frame clock period so that all VMCs converge toward an identical clock period in phase with the other VMCs. In an aircraft control system, the "nominal frame clock period" is determined by the system architecture, and is usually set by the rate at which the inertial sensor measures the changes in attitude and velocity that are in turn used to perform flight control. The key to the correctness of this algorithm lies in the fact that all participating VMCs can (and do) reach the same conclusion as to the largest phase difference and thereby agree on a common phase angle to synchronize to.

In systems constructed in accordance with this invention, each VMC adjusts its frame clock period to be either shorter or longer than the nominal frame clock period so that all VMCs converge toward an identical clock period in phase with the other VMCs.

This algorithm utilizes the transmission and receipt of messages via a cross-channel data-link (CCDL) from each VMC to adjust the time that a message is sent, and is continuously applied by all participating VMCs. The algorithm provides for both initial VMC synchronization and the continuing synchronization of each VMC with each other following initialization.

While the present invention has been described in terms of its presently preferred embodiments, it will be apparent to those skilled in the art that various changes can be made to the disclosed embodiments without departing from the scope of the invention as defined by the following claims.

What is claimed is:

1. A method for synchronizing frame clocks in a plurality of processors, the method comprising the steps of:
   (a) sending data packets from each of the processors to each of the other processors;
   (b) each of the processors receiving the data packets and identifying two of the data packets having the largest phase difference;
   (c) using the largest phase difference to determine a target synchronization phase angle;
   (d) adjusting a period of a frame clock so that the frame clock approaches the target synchronization phase angle; and
   (e) repeating steps (a), (b), (c) and (d).

2. The method of claim 1, wherein the data packets are sent ahead of the frame clock in the sending processor by a packet transmission time.

3. The method of claim 1, wherein the target synchronization angle is an angle opposite to an angle defined by the largest phase difference.

4. The method of claim 1, wherein the step of using the largest phase difference to determine the target synchronization phase angle comprises the steps of:
   bisecting a phase angle representative of the largest phase difference to produce a bisected phase angle; and
   adding 180° to the bisected phase angle to produce the target synchronization phase angle.

5. The method of claim 1, wherein the step of adjusting the period of the frame clock so that the frame clock approaches the target synchronization phase angle comprises the steps of:
   determining the phase difference between the target synchronization phase angle and the frame clock;
   multiplying the phase difference between the target synchronization phase angle and the frame clock by a damping factor to produce an adjustment period; and
   increasing or decreasing the period of the frame clock by the adjustment period.

6. The method of claim 5, further comprising the step of:
   limiting the phase difference between the target synchronization phase angle and the frame clock prior to the step of multiplying the phase difference by the damping factor.

7. The method of claim 1, wherein the data packets are sent for each frame clock period.

8. The method of claim 1, wherein arrival times of the data packets of each of the receiving processors are measured with respect to a local frame clock.

9. The method of claim 1, further comprising the step of:
   assigning a time stamp to each of the received data packets.

* * * * *